United States Patent
Ikejiri et al.

(10) Patent No.: US 10,622,673 B2
(45) Date of Patent: Apr. 14, 2020

(54) SOLID ELECTROLYTE SHEET, METHOD FOR MANUFACTURING SAME, AND SODIUM ION ALL-SOLID-STATE SECONDARY CELL

(71) Applicant: NIPPON ELECTRIC GLASS CO., LTD., Otsu-shi, Shiga (JP)

(72) Inventors: Junichi Ikejiri, Otsu (JP); Hideo Yamauchi, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/742,538

(22) PCT Filed: Jul. 27, 2016

(86) PCT No.: PCT/JP2016/072041
§ 371 (c)(1),
(2) Date: Jan. 8, 2018

(87) PCT Pub. No.: WO2017/026285
PCT Pub. Date: Feb. 16, 2017

(65) Prior Publication Data
US 2018/0183094 A1    Jun. 28, 2018

(30) Foreign Application Priority Data
Aug. 10, 2015  (JP) ................. 2015-157936

(51) Int. Cl.
*H01M 10/0562*  (2010.01)
*H01M 10/054*  (2010.01)
(Continued)

(52) U.S. Cl.
CPC ......... *H01M 10/0562* (2013.01); *C04B 35/10* (2013.01); *C04B 35/113* (2013.01);
(Continued)

(58) Field of Classification Search
CPC ........... H01M 10/0562; H01M 10/054; H01M 2300/0071; C04B 35/63424;
(Continued)

(56) References Cited

U.S. PATENT DOCUMENTS

| | | |
|---|---|---|
| 2007/0231704 A1 | 10/2007 | Inda |
| 2011/0300451 A1 | 12/2011 | Inda |

(Continued)

FOREIGN PATENT DOCUMENTS

| | | | |
|---|---|---|---|
| CN | 1233082 A | 10/1999 | |
| CN | 1452794 A | 10/2003 | |

(Continued)

OTHER PUBLICATIONS

Official Communication issued in International Patent Application No. PCT/JP2016/072041, dated Oct. 25, 2016.
(Continued)

*Primary Examiner* — Cynthia K Walls
(74) *Attorney, Agent, or Firm* — Keating and Bennett, LLP

(57) ABSTRACT

Provided is a thin beta-alumina-based solid electrolyte sheet having a high ion conduction value. The solid electrolyte sheet containing β-alumina and/or β"-alumina and having a thickness of 1 mm or less and a voidage of 20% or less.

9 Claims, 1 Drawing Sheet

(51) Int. Cl.
*C04B 35/113* (2006.01)
*C04B 35/626* (2006.01)
*C04B 35/634* (2006.01)
*C04B 35/10* (2006.01)
*C04B 35/622* (2006.01)
*C04B 35/64* (2006.01)

(52) U.S. Cl.
CPC .... *C04B 35/6264* (2013.01); *C04B 35/62218* (2013.01); *C04B 35/62625* (2013.01); *C04B 35/62635* (2013.01); *C04B 35/63424* (2013.01); *C04B 35/64* (2013.01); *H01M 10/054* (2013.01); *C04B 2235/3201* (2013.01); *C04B 2235/3203* (2013.01); *C04B 2235/3206* (2013.01); *C04B 2235/3217* (2013.01); *C04B 2235/3225* (2013.01); *C04B 2235/3244* (2013.01); *C04B 2235/604* (2013.01); *C04B 2235/6025* (2013.01); *C04B 2235/77* (2013.01); *H01M 2300/0071* (2013.01)

(58) Field of Classification Search
CPC .......... C04B 35/6264; C04B 35/62635; C04B 35/64; C04B 35/62218; C04B 35/10; C04B 35/62625; C04B 35/113; C04B 2235/77; C04B 2235/6025; C04B 2235/3201; C04B 2235/3203; C04B 2235/3206; C04B 2235/3217; C04B 2235/3225; C04B 2235/3244; C04B 2235/604
See application file for complete search history.

(56) References Cited

U.S. PATENT DOCUMENTS

2013/0337309 A1* 12/2013 Virkar .............. H01M 10/3927
   429/104
2017/0005337 A1   1/2017 Ikejiri et al.

FOREIGN PATENT DOCUMENTS

| CN | 1755841 A | 4/2006 |
| CN | 104685694 A | 6/2015 |
| CN | 105637694 A | 6/2016 |
| JP | 05-205741 A | 8/1993 |
| JP | 11-012028 A | 1/1999 |
| JP | 11-049562 A | 2/1999 |
| JP | 2007-294429 A | 11/2007 |
| JP | 2010-015782 A | 1/2010 |
| JP | 2014-072009 A | 4/2014 |
| WO | 01/99220 A1 | 12/2001 |
| WO | 2013/177088 A1 | 11/2013 |
| WO | 2015/087734 A1 | 6/2015 |

OTHER PUBLICATIONS

Official Communication issued in corresponding Japanese Patent Application No. 2015-157936, dated Jun. 6, 2019.
Ionotec Ltd., "Conductive ceramics", Innovation With Electroceramics, http://www.ionotec.com/conductive-ceramics.html, retrieved on May 29, 2019, 6 pages.
Hou et al., "Investigation of Sintering Schedule of ZrO2 Toughened β"—Al2O3 Ceramic, Journal of Shanghai Electric Technology, the 4th period of vol. 6, Dec. 2013, pp. 14-19.

* cited by examiner

[FIG. 1]
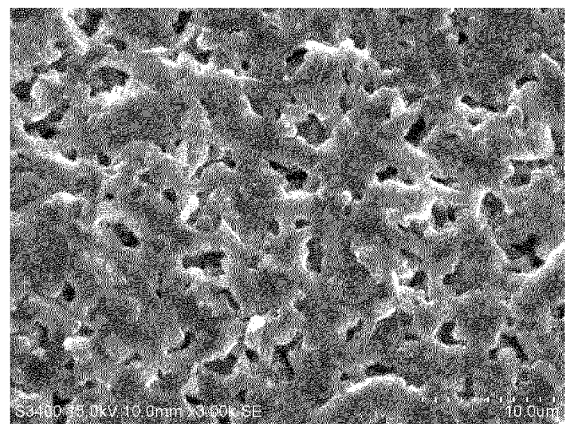
[FIG. 2]
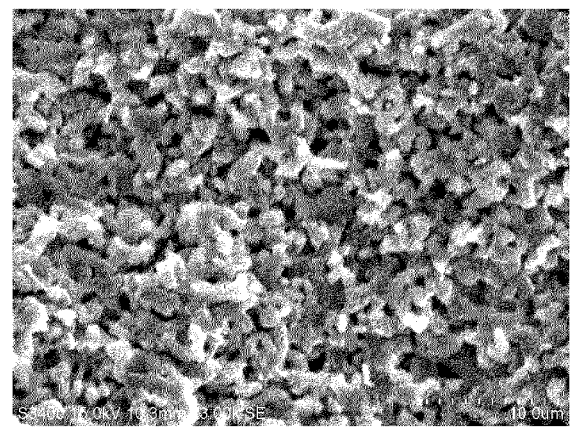

SOLID ELECTROLYTE SHEET, METHOD FOR MANUFACTURING SAME, AND SODIUM ION ALL-SOLID-STATE SECONDARY CELL

TECHNICAL FIELD

The present invention relates to beta-alumina-based solid electrolyte sheets for use in power storage devices, such as sodium ion secondary cells, method for manufacturing the same, and sodium ion all-solid-state secondary cells.

BACKGROUND ART

Lithium ion secondary cells have secured their places as high-capacity and light-weight power sources essential for mobile devices, electric vehicles, and so on. However, current lithium ion secondary cells employ as their electrolytes, mainly, combustible organic electrolytic solutions and, therefore, raise concerns about the risk of ignition or the like. As a solution to this problem, developments of lithium ion all-solid-state cells using a solid electrolyte instead of an organic electrolytic solution have been promoted (see, for example, Patent Literature 1).

However, an issue of concern with lithium is global price increase of raw materials thereof. To cope with this, sodium has attracted attention as a material to replace lithium and there is proposed a sodium ion all-solid-state cell in which a NASICON-type sodium ion-conductive crystal made of $Na_3Zr_2Si_2PO_{12}$ is used as a solid electrolyte (see, for example, Patent Literature 2). Alternatively, beta-alumina-based solid electrolytes, including β-alumina and β″-alumina, are also known to exhibit high sodium ion conductivity. These solid electrolytes are also used as solid electrolytes for sodium-sulfur cells.

From the viewpoint of increasing the energy density per unit volume of the sodium ion all-solid-state cell or the like, it is desirable that such a solid electrolyte as above be formed into a sheet.

CITATION LIST

Patent Literature

Patent Literature 1: JP-A H05-205741
Patent Literature 2: JP-A 2010-15782

SUMMARY OF INVENTION

Technical Problem

A sheet-form solid electrolyte is manufactured, for example, by a method (green sheet method) of making raw material powder of the solid electrolyte into a slurry, forming a green sheet from the slurry, and then firing the green sheet. However, when a beta-alumina-based solid electrolyte sheet is manufactured by the above method, there arises a problem that its ion conduction value is likely to decrease.

Therefore, an object of the present invention is to provide a beta-alumina-based solid electrolyte sheet having a high ion conduction value, and a sodium ion all-solid-state cell using the same.

Solution to Problem

A solid electrolyte sheet according to the present invention contains β-alumina and/or β″-alumina and has a thickness of 1 mm or less and a voidage of 20% or less.

Since the solid electrolyte sheet according to the present invention has a small thickness of 1 mm or less, the distance taken to conduct ions in the solid electrolyte is short. In addition, since the voidage is as small as 20% or less, the denseness of particles of β-alumina and/or β″-alumina in the solid electrolyte sheet is high. For the above reasons, the solid electrolyte sheet according to the present invention has excellent ion conductivity. Note that the "voidage" of the solid electrolyte sheet in the present invention refers to the proportion of the area of voids in an observed image of a cutaway section of the solid electrolyte sheet.

The solid electrolyte sheet according to the present invention preferably has an ion conduction value of 1 S (Siemens) or more. Note that the term "ion conduction value" in the present invention refers to the value obtained by multiplying the ion conductivity (S/cm) of the solid electrolyte sheet by the thickness thereof.

A solid electrolyte sheet according to the present invention contains β-alumina and/or β″-alumina and has a thickness of 1 mm or less and an ion conduction value of 1 S or more.

The solid electrolyte sheet according to the present invention preferably contains, in % by mole, 65 to 98% $Al_2O_3$, 2 to 20% $Na_2O$, and 0.3 to 15% $MgO+Li_2O$. Note that "$MgO+Li_2O$" means the total of the contents of MgO and $Li_2O$.

The solid electrolyte sheet according to the present invention preferably further contains 1 to 15% $ZrO_2$.

The solid electrolyte sheet according to the present invention preferably further contains 0.01 to 5% $Y_2O_3$.

The solid electrolyte sheet according to the present invention is suitable for use in a sodium ion all-solid-state secondary cell.

A sodium ion all-solid-state secondary cell according to the present invention includes the above-described solid electrolyte sheet, a positive electrode layer formed on one side of the solid electrolyte sheet, and a negative electrode layer formed on the other side of the solid electrolyte sheet.

The present invention is related to a method for manufacturing a solid electrolyte sheet containing β-alumina and/or β″-alumina and having a thickness of 1 mm or less, the method including the steps of: (a) making raw material powder containing $Al_2O_3$ as a main component into a slurry; (b) applying the slurry on a base material and drying the slurry to obtain a green sheet; and (c) isostatically pressing the green sheet and then firing the green sheet to produce β-alumina and/or β″-alumina.

As described previously, when a beta-alumina-based solid electrolyte sheet is manufactured by the green sheet method, there arises a problem that its ion conduction value is likely to decrease. The reason for this is not clear but the inventors infer it as follows. Uniaxial pressing is normally used as pressing in producing a green sheet. In this case, pressure is applied to the green sheet only from a particular direction and, therefore, raw material powder flows away in a direction where no pressure is applied to the green sheet, which decreases the adhesion between powder particles. Hence, production of β-alumina and/or β″-alumina due to a solid-phase reaction during firing becomes less likely to occur and the solid electrolyte obtained after the firing tends to have poor denseness. Unlike the above, when the green sheet is subjected to isostatic pressing before being fired, the adhesion of raw material powder is increased, so that β-alumina and/or β″-alumina becomes more likely to be produced during firing and the solid electrolyte obtained after the firing has excellent denseness. As a result, the ion conductivity of the solid electrolyte is likely to increase.

In the method for manufacturing a solid electrolyte sheet according to the present invention, the raw material powder preferably contains, in % by mole, 65 to 98% $Al_2O_3$, 2 to 20% $Na_2O$, and 0.3 to 15% $MgO+Li_2O$.

In the method for manufacturing a solid electrolyte sheet according to the present invention, the raw material powder preferably contains, in % by mole, 1 to 15% $ZrO_2$. Because $ZrO_2$ has the effect of inhibiting abnormal grain growth of β-alumina and/or β"-alumina during firing, the denseness of the solid electrolyte sheet obtained after the firing can be further increased.

In the method for manufacturing a solid electrolyte sheet according to the present invention, the raw material powder preferably contains, in % by mole, 0.01 to 5% $Y_2O_3$. Because $Y_2O_3$, like $ZrO_2$, has the effect of inhibiting abnormal grain growth of β-alumina and/or β"-alumina during firing, the denseness of the solid electrolyte sheet obtained after the firing can be further increased.

In the method for manufacturing a solid electrolyte sheet according to the present invention, the green sheet is preferably pressed at a pressure of 5 MPa or more. By doing so, raw material powder particles can be brought into close contact with each other, so that a solid-phase reaction becomes likely to occur during firing. Therefore, the production of β-alumina and/or β"-alumina is promoted and the denseness of the solid electrolyte sheet obtained after the firing can be further increased.

Advantageous Effects of Invention

According to the present invention, a beta-alumina-based solid electrolyte sheet having a high ion conduction value can be manufactured.

BRIEF DESCRIPTION OF DRAWINGS

FIG. 1 is a SEM (scanning electron microscope) image of the cross section of sample No. 6 in an example.

FIG. 2 is a SEM image of the cross section of sample No. 15 in an example.

DESCRIPTION OF EMBODIMENTS

A solid electrolyte sheet according to the present invention contains β-alumina and/or β"-alumina and has a thickness of 1 mm or less and a voidage of 20% or less.

A smaller thickness of the solid electrolyte sheet is more preferred because the distance taken to conduct ions in the solid electrolyte becomes shorter to increase the ion conductivity. Furthermore, the thickness of the solid electrolyte sheet becomes more likely to be uniform. Moreover, in the case of a solid electrolyte for a sodium ion all-solid-state cell, the sodium ion all-solid-state cell has a higher energy density per unit volume. Specifically, the thickness of the solid electrolyte sheet according to the present invention is 1 mm or less, preferably 0.8 mm or less, and particularly preferably less than 0.5 mm. The lower limit of the thickness of the solid electrolyte sheet is not particularly limited but is, actually, preferably not less than 0.01 mm and more preferably not less than 0.03 mm.

The voidage of the solid electrolyte sheet is 20% or less, preferably 18% or less, and particularly preferably 15% or less. If the voidage is too high, the adhesion of particles of β-alumina and/or β"-alumina in the solid electrolyte sheet becomes insufficient, so that the ion conduction value is likely to decrease. The lower limit of the voidage is not particularly limited but is, actually, not less than 0.1%.

The density of the solid electrolyte sheet is preferably 3.26 to 3.4 $g/cm^3$. If the density of the solid electrolyte sheet is too small, the adhesion of β-alumina and/or β"-alumina becomes poor, so that the ion conductivity tends to be poor. On the other hand, the density of beta-alumina-based solid electrolyte is too large, the amount of β-alumina and/or β"-alumina produced becomes small, so that the ion conductivity tends to be poor.

Since the solid electrolyte sheet according to the present invention contains β-alumina and/or β"-alumina and satisfies the above specific parameters, it exhibits good ion conductivity. Specifically, the ion conduction value of the solid electrolyte sheet in the thickness direction is preferably 1 S or more, more preferably 1.5 S or more, and particularly preferably 2 S or more.

The solid electrolyte sheet according to the present invention preferably contains, in % by mole, 65 to 98% $Al_2O_3$, 2 to 20% $Na_2O$, and 0.3 to 15% $MgO+Li_2O$. Reasons why the composition is limited as just described will be described below.

$Al_2O_3$ is a main component that forms β-alumina and β"-alumina. The content of $Al_2O_3$ is preferably 65 to 98% and particularly preferably 70 to 95%. If $Al_2O_3$ is too less, the ion conductivity of the solid electrolyte is likely to decrease. On the other hand, if $Al_2O_3$ is too much, α-alumina having no sodium-ion conductivity remains in the solid electrolyte to make the ion conductivity of the solid electrolyte likely to decrease.

$Na_2O$ is a component that gives the solid electrolyte sodium-ion conductivity. The content of $Na_2O$ is preferably 2 to 20%, more preferably 3 to 18%, and particularly preferably 4 to 16%. If $Na_2O$ is too less, the above effect is less likely to be achieved. On the other hand, if $Na_2O$ is too much, surplus sodium forms compounds not contributing to ion conductivity, such as $NaAlO_2$, so that the ion conductivity is likely to decrease.

MgO and $Li_2O$ are components (stabilizing agents) that stabilize the structures of β-alumina and β"-alumina. The content of $MgO+Li_2O$ is preferably 0.3 to 15%, more preferably 0.5 to 10%, and particularly preferably 0.8 to 8%. If $MgO+Li_2O$ is too less, α-alumina remains in the solid electrolyte to make the ion conductivity likely to decrease. On the other hand, if $MgO+Li_2O$ is too much, MgO or $Li_2O$ having failed to function as a stabilizing agent remains in the solid electrolyte, so that the ion conductivity is likely to decrease.

The solid electrolyte sheet according to the present invention preferably contains, in addition to the above components, $ZrO_2$ and/or $Y_2O_3$. $ZrO_2$ and $Y_2O_3$ have the effect of inhibiting abnormal grain growth of β-alumina and/or β"-alumina during firing to increase the adhesion of particles of β-alumina and/or β"-alumina. The content of $ZrO_2$ is preferably 0 to 15%, more preferably 1 to 13%, and particularly preferably 2 to 10%. The content of $Y_2O_3$ is preferably 0 to 5%, more preferably 0.01 to 4%, and particularly preferably 0.02 to 3%. If $ZrO_2$ or $Y_2O_3$ is too much, the amount of β-alumina and/or β"-alumina produced decreases to make the ion conductivity of the solid electrolyte likely to decrease.

Next, a description will be given of a method for manufacturing a solid electrolyte sheet according to the present invention. The present invention is related to a method for manufacturing a solid electrolyte sheet containing β-alumina and/or β"-alumina and having a thickness of 1 mm or less, the method including the steps of: (a) making raw material powder containing $Al_2O_3$ as a main component into a slurry; (b) applying the slurry on a base material and drying the slurry to obtain a green sheet; and (c) isostatically pressing the green sheet and then firing the green sheet to produce β-alumina and/or β"-alumina.

The raw material powder contains $Al_2O_3$ as a main component. Specifically, the raw material powder preferably contains, in % by mole, 65 to 98% $Al_2O_3$, 2 to 20% $Na_2O$, and 0.3 to 15% $MgO+Li_2O$. Because reasons why the composition is limited as just described are as described previously, further explanation will be omitted.

The average particle size (D50) of the raw material powder is preferably 10 μm or less. If the average particle size of the raw material powder is too large, the contact area between the raw material powder particles decreases, so that a solid-phase reaction is less likely to sufficiently progress. Furthermore, the solid electrolyte sheet tends to be difficult to reduce in thickness. The lower limit of the average particle size of the raw material powder is not particularly limited but is, actually, not less than 0.1 μm.

The raw material powder is first mixed by a dry or wet process, a binder, a plasticizer, a solvent, and so on are then added to the raw material powder, and the mixture is kneaded into a slurry.

The solvent may be water or an organic solvent, such as ethanol or acetone. However, when water is used as the solvent, a sodium component may elute off from the raw material powder to increase the pH of the slurry and agglomerate the raw material powder. Therefore, an organic solvent is preferably used.

Next, the obtained slurry is applied onto a base material made of PET (polyethylene terephthalate) or so on and dried, thus obtaining a green sheet. The application of the slurry can be implemented with a doctor blade, a die coater or other means. The thickness of the green sheet is preferably 0.05 to 2.0 mm and particularly preferably 0.1 to 1.8 mm. If the thickness of the green sheet is too small, the mechanical strength of the solid electrolyte tends to be poor. On the other hand, if the thickness of the green sheet is too large, the thickness of the solid electrolyte becomes large to increase the distance taken to conduct ions in the solid electrolyte and make the energy density per unit cell likely to decrease.

Furthermore, the green sheet is isostatically pressed and fired to produce β-alumina and/or β"-alumina, thus obtaining a solid electrolyte sheet. As described previously, it can be considered that when the green sheet is subjected to isostatic pressing before being fired, the adhesion of particles of β-alumina and/or β"-alumina increases, so that the ion conduction value is likely to increase. The pressure during the pressing is preferably 5 MPa or more and particularly preferably 10 MPa or more. If the pressure during the pressing is too low, the adhesion between raw material powder particles becomes insufficient, so that a solid-phase reaction becomes less likely to occur during firing. Therefore, β-alumina and/or β"-alumina are less likely to be produced. In addition, the adhesion of particles of β-alumina and/or β"-alumina in the solid electrolyte becomes insufficient, so that the ion conduction value is likely to decrease.

The firing temperature is preferably 1400° C. or more and particularly preferably 1500° C. or more. If the firing temperature is too low, the reaction of the raw material powder becomes insufficient, so that the amount of β-alumina and/or β"-alumina produced is likely to decrease. Furthermore, the adhesion of particles of β-alumina and/or β"-alumina in the solid electrolyte becomes insufficient, so that the ion conduction value is likely to decrease. The upper limit of the firing temperature is preferably not more than 1750° C. and particularly not more than 1700° C. If the firing temperature is too high, the amount of evaporation of sodium component or the like becomes large, so that other crystals tend to precipitate and the denseness tends to decrease. As a result, the ion conductivity of the solid electrolyte is likely to decrease. The firing time is appropriately adjusted so that β-alumina and/or β"-alumina can be sufficiently produced. Specifically, the firing time is preferably 10 to 120 minutes and particularly preferably 20 to 80 minutes.

The solid electrolyte sheet according to the present invention is suitable for use in a sodium ion all-solid-state secondary cell. The sodium ion all-solid-state secondary cell includes the solid electrolyte sheet according to the present invention, a positive electrode layer formed on one side of the solid electrolyte sheet, and a negative electrode layer formed on the other side of the solid electrolyte sheet. The positive electrode layer and the negative electrode layer each contain an active material. The active material acts as a positive-electrode active material or a negative-electrode active material and can insert and extract sodium ions during charge and discharge.

Examples of the positive-electrode active material include: layered sodium transition metal oxide crystals, such as $NaCrO_2$, $Na_{0.7}MnO_2$, and $NaFe_{0.2}Mn_{0.4}Ni_{0.4}O_2$; sodium transition metal phosphate crystals containing Na, M (where M represents at least one transition metal element selected from Cr, Fe, Mn, Co, and Ni), P, and O, such as $Na_2FeP_2O_7$, $NaFePO_4$, and $Na_3V_2(PO_4)_3$; and like active material crystals.

Particularly, the crystals containing Na, M, P, and O are preferred because they have high capacity and excellent chemical stability. Preferred among them are triclinic crystals belonging to space group P1 or P-1 and particularly preferred are crystals represented by the general formula $Na_xMyP_2O_7$ (where $1.20 \leq x \leq 2.80$ and $0.95 \leq y \leq 1.60$), because these crystals have excellent cycle characteristics.

Examples of the negative-electrode active material include: crystals containing at least one selected from Nb and Ti and O, metallic crystals of at least one selected from Sn, Bi, and Sb; and other active material crystals.

The crystals containing at least one selected from Nb and Ti and O are preferred because they have excellent cycle characteristics. If the crystal containing at least one selected from Nb and Ti and O further contains Na and/or Li, this is preferred because the charge/discharge efficiency (the proportion of discharge capacity to charge capacity) increases and a high charge/discharge capacity can be thus maintained. Above all, if the crystal containing at least one selected from Nb and Ti and O is an orthorhombic, hexagonal, cubic or monoclinic crystal, particularly a monoclinic crystal belonging to space group P21/m, this is preferred because a capacity decrease is less likely to occur even during charge and discharge at a large current. An example of the orthorhombic crystal is $NaTi_2O_4$, examples of the hexagonal crystal include $Na_2TiO_3$, $NaTi_8O_{13}$, $NaTiO_2$, $LiNbO_3$, $LiNbO_2$, $Li_7NbO_6$, $LiNbO_2$, and $Li_2Ti_3O_7$, examples of the cubic crystal include $Na_2TiO_3$, $NaNbO_3$, $Li_4Ti_5O_{12}$, and $Li_3NbO_4$, examples of the monoclinic crystal include $Na_2Ti_6O_{13}$, $NaTi_2O_4$, $Na_2TiO_3$, $Na_4Ti_5O_{12}$, $Na_2Ti_4O_9$, $Na_2Ti_9O_{19}$, $Na_2Ti_3O_7$, $Na_2Ti_3O_7$, $Li_{1.7}Nb_2O_5$, $Li_{1.9}Nb_2O_5$, $Li_{12}Nb_{13}O_{33}$, and $LiNb_3O_8$, and an example of the monoclinic crystal belonging to space group P21/m is $Na_2Ti_3O_7$.

The crystal containing at least one selected from Nb and Ti and O preferably further contains at least one selected from B, Si, P, and Ge. These components have the effect of facilitating the formation of an amorphous phase together with the active material crystal and increasing the sodium-ion conductivity.

Other negative-electrode active materials that can be used include metallic crystals of at least one selected from Sn, Bi, and Sb and glasses containing at least one selected from Sn, Bi, and Sb. These materials are preferred because they have high capacity and they are less likely to cause a capacity decrease even during charge and discharge at a large current.

The positive electrode layer and the negative electrode layer may be layers of a composite material as an electrode made of a composite of an active material and a sodium ion-conductive solid electrolyte. The sodium ion-conductive solid electrolyte is a crystal that acts as a sodium ion-conducting path between the active material and the counter electrode and has excellent sodium-ion conductivity and high electron insulating properties. In the absence of the sodium ion-conductive solid electrolyte, the sodium ion transfer resistance between the active material and the counter electrode becomes high, so that the charge/discharge capacity and the cell voltage are likely to decrease.

Examples of the sodium ion-conductive solid electrolyte that can be used include powders of the above-described beta-alumina-based solid electrolytes. Other examples of the sodium ion-conductive solid electrolyte include crystals containing: at least one selected from Al, Y, Zr, Si, and P; Na; and O. These sodium ion-conductive solid electrolytes are preferred because they have excellent sodium-ion conductivity, high electron insulating properties, and excellent stability.

The sodium ion-conductive crystal is preferably made of a compound represented by the general formula $Na_sAl_tA2_uO_v$ (where A1 represents at least one selected from Al, Y, Yb, Nd, Nb, Ti, Hf, and Zr, A2 represents at least one selected from Si and P, s=1.4 to 5.2, t=1 to 2.9, u=2.8 to 4.1, and v=9 to 14). In this relation, A1 is preferably at least one selected from Y, Nb, Ti, and Zr and the preferred ranges are s=2.5 to 3.5, t=1 to 2.5, u=2.8 to 4, and v=9.5 to 12. By doing so, a crystal having excellent ion conductivity can be obtained.

The sodium ion-conductive crystal is particularly preferably a NASICON crystal. Preferred examples of the NASICON crystal include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$ and the particularly preferred is $Na_{3.12}Zr_{1.88}Y_{0.12}Si_2PO_{12}$ because it has excellent sodium-ion conductivity.

If the sodium ion-conductive crystal is a monoclinic, hexagonal or trigonal crystal, this is preferred because the sodium-ion conductivity further increases.

Another example of the sodium ion-conductive solid electrolyte that can be used is $Na_5YSi_4O_{12}$.

The positive electrode layer and the negative electrode layer preferably further contain a conductive aid. The conductive aid is a component to be added to the electrode layer in order to achieve a capacity increase and high-rate charge and discharge of the electrode. Specific examples of the conductive aid include highly electrically conductive carbon blacks, such as acetylene black and Ketjenblack, graphite, coke, and metal powders, such as Ni power, Cu powder, and Ag powder. Among them, any of highly electrically conductive carbon blacks, Ni powder, and Cu powder is preferably used, which exhibit excellent electrical conductivity even when added in very small amount.

Examples

Hereinafter, a description will be given in detail of the present invention with reference to its working examples, but the present invention is not limited to these working examples.

Tables 1 to 3 show working examples (Nos. 1 to 10) and comparative examples (Nos. 11 and 15).

TABLE 1

|  |  | No. 1 | No. 2 | No. 3 | No. 4 | No. 5 |
|---|---|---|---|---|---|---|
| Composition (% by mole) | $Na_2O$ | 14.9 | 14.9 | 14.2 | 14.9 | 14.2 |
|  | MgO | 5.7 | 5.7 | 5.5 | 5.7 | 5.5 |
|  | $Al_2O_3$ | 79.4 | 79.4 | 75.6 | 79.2 | 75.4 |
|  | $ZrO_2$ |  |  | 4.7 |  | 4.7 |
|  | $Y_2O_3$ |  |  |  | 0.2 | 0.2 |
| Pressing Method |  |  |  | Isostatic |  |  |
| Pressure during Pressing (MPa) |  | 40 | 40 | 40 | 40 | 40 |
| Thickness (mm) |  | 0.18 | 0.4 | 0.18 | 0.17 | 0.18 |
| Voidage (%) |  | 6.9 | 7.2 | 5.8 | 6.3 | 5.2 |
| Ion Conduction Value (S) |  | 4.4 | 2.0 | 5.4 | 4.8 | 6.5 |
| Discharge Capacity ($Ah/cm^3$) |  | 1.11 | 0.52 | 1.60 | 1.58 | 1.67 |

TABLE 2

|  |  | No. 6 | No. 7 | No. 8 | No. 9 | No. 10 |
|---|---|---|---|---|---|---|
| Composition (% by mole) | $Na_2O$ | 14.2 | 14.4 | 14.6 | 13.7 | 14.2 |
|  | MgO | 5.5 | 5.5 | 5.6 | 5.3 | 5.5 |
|  | $Al_2O_3$ | 75.4 | 76.6 | 77.6 | 72.9 | 75.4 |
|  | $ZrO_2$ | 4.7 | 3.4 | 2.1 | 7.8 | 4.7 |
|  | $Y_2O_3$ | 0.2 | 0.1 | 0.06 | 0.24 | 0.2 |
| Pressing Method |  |  |  | Isostatic |  |  |
| Pressure during Pressing (MPa) |  | 40 | 40 | 40 | 40 | 20 |
| Thickness (mm) |  | 0.45 | 0.2 | 0.19 | 0.15 | 0.17 |
| Voidage (%) |  | 6.0 | 5.8 | 6.1 | 5.8 | 5.2 |
| Ion Conduction Value (S) |  | 2.3 | 5.3 | 4.8 | 5.1 | 6.3 |
| Discharge Capacity ($Ah/cm^3$) |  | 0.67 | 1.47 | 1.26 | 1.39 | 1.65 |

TABLE 3

|  |  | No. 11 | No. 12 | No. 13 | No. 14 | No. 15 |
|---|---|---|---|---|---|---|
| Composition (% by mole) | $Na_2O$ | 14.9 | 14.2 | 14.9 | 14.2 | 14.2 |
|  | MgO | 5.7 | 5.5 | 5.7 | 5.5 | 5.5 |
|  | $Al_2O_3$ | 79.4 | 75.6 | 79.2 | 75.4 | 75.4 |
|  | $ZrO_2$ |  | 4.7 |  | 4.7 | 4.7 |
|  | $Y_2O_3$ |  |  | 0.2 | 0.2 | 0.2 |
| Pressing Method |  |  | Isostatic |  | — | Uniaxial |
| Pressure during Pressing (MPa) |  | 40 | 40 | 40 | — | 40 |
| Thickness (mm) |  | 1.7 | 1.2 | 1.1 | — | 0.19 |
| Voidage (%) |  | 7.4 | 6.9 | 7.1 | — | 64.7 |
| Ion Conduction Value (S) |  | 0.1 | 0.81 | 0.7 | — | 0.15 |
| Discharge Capacity ($Ah/cm^3$) |  | 0.18 | 0.23 | 0.23 |  | 0.08 |

(a) Preparation of Slurry

Using sodium carbonate ($Na_2CO_3$), sodium hydrogen carbonate ($NaHCO_3$), magnesium oxide (MgO), aluminum oxide ($Al_2O_3$), zirconium oxide ($ZrO_2$), and yttrium oxide ($Y_2O_3$), powders of these raw materials were formulated to give compositions described in Tables 1 to 3. The raw material powders were wet mixed for four hours using ethanol as a medium. After ethanol was evaporated from the mixture, an acrylic acid ester-based copolymer (OLYCOX 1700 manufactured by Kyoeisha Chemical Co., Ltd.) as a binder and benzyl butyl phthalate as a plasticizer were used and weighed with the mixture to reach a ratio of raw material powders to binder to plasticizer of 83.5:15:1.5 (mass ratio) and the mixture was dispersed into N-methylpyrrolidinone, followed by fully stirring with a planetary centrifugal mixer to form a slurry.

(b) Preparation of Green Sheet

The slurry obtained as above was applied onto a PET film using a doctor blade and dried at 70° C., thus obtaining a green sheet.

(c) Pressing and Firing of Green Sheet

The obtained green sheet was pressed at 90° C. and a pressure described in Tables 1 to 3 for five minutes using an isostatic pressing apparatus. The pressed green sheet was fired at 1600° C. for 30 minutes, thus obtaining a solid electrolyte sheet. Note that as for sample No. 14 the green sheet was not pressed. As for sample No. 15, the green sheet was pressed at 90° C. and a pressure described in Table 3 for five minutes using a uniaxial pressing apparatus (N4028-00 manufactured by NPa System Co., Ltd.). SEM images of the cross sections of samples Nos. 6 and 15 are shown in FIGS. 1 and 2, respectively.

(d) Measurement of Ion Conduction Value

After a gold electrode was formed as an ion blocking electrode on a surface of the solid electrolyte sheet, the electrode was measured within a frequency range of 1 to $10^7$ Hz by the AC impedance method to obtain a resistance value from a Cole-Cole plot. An ion conduction value was calculated from the obtained resistance value. The measurement was conducted at 18° C. The results are shown in Table 1.

(e) Measurement of Voidage

The cutaway section of the solid electrolyte sheet was observed at 3000-fold magnification by a SEM (S-3400N Type II by Hitachi High-Technologies Corporation) to obtain a SEM image. Next, the obtained SEM image was binarized by a discriminant analysis method using image processing software (WinROOF created by MITANI Corporation). Furthermore, the proportion of the area of voids in the binarized image was calculated, thus obtaining the calculated value as a voidage. The results are shown in Tables 1 to 3.

(f) Production of Sodium Ion all-Solid-State Secondary Cell (f-1) Preparation of Precursor Powder of Positive-Electrode Active Material Crystal Sodium metaphosphate ($NaPO_3$), ferric oxide ($Fe_2O_3$), and orthophosphoric acid ($H_3PO_4$) were used as raw materials, powders of these raw materials were formulated to give a composition of, in % by mole, 40% $Na_2O$, 20% $Fe_2O_3$, and 40% $P_2O_5$, and the mixture was melted in an air atmosphere at 1250° C. for 45 minutes. Thereafter, the molten glass was poured between a pair of rolls and formed into a film shape with rapid cooling, thus preparing a precursor of positive-electrode active material crystal.

The obtained precursor of positive-electrode active material crystal was ground for five hours with a ball mill using a 20-mm diameter $ZrO_2$ ball and the ground product was passed through a resin-made sieve with 120-µm openings to obtain coarse glass powder having an average particle size of 3 to 15 µm. Next, the coarse glass powder was ground, using ethanol as a grinding aid, for 80 hours with a ball mill using a 3-mm diameter $ZrO_2$ ball, thus obtaining precursor powder of positive-electrode active material crystal having an average particle size of 0.7 µm.

To confirm a precipitated active material crystal, 93% by mass precursor powder of positive-electrode active material crystal obtained as above and 7% by mass acetylene black (SUPER C65 manufactured by TIMCAL) were fully mixed and the mixed powder was heat-treated in a mixed gas atmosphere of nitrogen and hydrogen (96% by volume nitrogen and 4% by volume hydrogen) at 450° C. for an hour. When the powder X-ray diffraction pattern of the heat-treated powder was checked, diffraction lines originating from a triclinic crystal ($Na_2FeP_2O_7$) belonging to space group P-1 were confirmed. The powder X-ray diffraction pattern was measured using an X-ray diffractometer (RINT-2000 manufactured by Rigaku Corporation).

(f-2) Preparation of Powder of Sodium Ion-Conductive Crystal (Powder of Sodium Ion-Conductive Solid Electrolyte)

Sodium carbonate ($Na_2CO_3$), aluminum oxide ($Al_2O_3$), and magnesium oxide (MgO) were used as raw materials, powders of these raw materials were formulated to give a composition of, in % by mole, 13.0% $Na_2O$, 80.2% $Al_2O_3$, and 6.8% MgO, and the mixed powder was fired in an air atmosphere at 1250° C. for four hours. The fired powder was ground for 24 hours with a ball mill using a 20-mm diameter $Al_2O_3$ ball. Thereafter, the powder was air-classified to obtain powder having an average particle size D50 of 2.0 µm. The obtained powder was heat-treated in an air atmosphere at 1640° C. for an hour to obtain powder of sodium ion-conductive crystal. The obtained powder of sodium ion-conductive crystal was immediately moved into and preserved in an environment of the dew point minus 40° C. or below.

(f-3) Production of Test Cell

Precursor powder of positive-electrode active material crystal, powder of sodium ion-conductive crystal, and acetylene black (SUPER C65 manufactured by TIMCAL) were weighed to reach, in % by mass, 60%, 35%, and 5%, respectively, and these powders were mixed for approximately 30 minutes using an agate mortar and an agate pestle. An amount of 20 parts by mass of N-methylpyrrolidinone containing 10% by mass polypropylene carbonate (manufactured by Sumitomo Seika Chemicals Co., Ltd.) was added to 100 parts by mass of the mixed powder and the mixture was fully stirred with a planetary centrifugal mixer to form a slurry. All the above operations were conducted in an environment of the dew point minus 40° C. or below.

The obtained slurry was applied, with an area of 1 $cm^2$ and a thickness of 200 µm, to one surface of the solid electrolyte sheet obtained above and then dried at 70° C. for three hours. Next, the slurry on the solid electrolyte sheet was fired in a mixed gas atmosphere of nitrogen and hydrogen (96% by volume nitrogen and 4% by volume hydrogen) at 450° C. for an hour, thus forming a positive electrode layer on the one surface of the solid electrolyte sheet. When the X-ray diffraction pattern of the obtained positive electrode layer was checked, diffraction lines originating from a triclinic crystal ($Na_2FeP_2O_7$), which is an active material crystal and belongs to space group P-1, and diffraction lines originating from a trigonal crystal (β''-alumina $[(Al_{10.32}Mg_{0.68}O_{16})(Na_{1.68}O)]$), which is a sodium ion-conductive crystal and belongs to space group R-3m, were confirmed.

A current collector formed of a 300-nm thick gold electrode was formed on the surface of the positive electrode layer using a sputtering device (SC-701AT manufactured by Sanyu Electron Co., Ltd.). Thereafter, metallic sodium serving as a counter electrode was pressure-bonded to the other surface of the solid electrolyte sheet opposite to the surface thereof on which the positive electrode layer was formed, in an argon atmosphere of the dew point minus 60° C. or below, and the obtained product was placed on a lower lid of a coin cell and covered with an upper lid to produce a CR2032-type test cell.

(f-4) Charge and Discharge Test

A charge and discharge test was conducted at 30° C. using each of the obtained test cells to measure the discharge capacity per unit volume. The results are shown in Table 1. In the charge and discharge test, charging (extraction of sodium ions from the positive-electrode active material) was implemented by CC (constant-current) charging from the open circuit voltage (OCV) to 4.3 V and discharging (insertion of sodium ions to the positive-electrode active material) was implemented by CC discharging from 4.3 V to 2 V. The C rate was 0.01 C. The discharge capacity was defined as the quantity of electricity discharged from unit volume of the sodium ion all-solid-state secondary cell.

As is obvious from Tables 1 to 3, samples Nos. 1 to 10 had a thickness of 0.15 to 0.45 mm and a voidage of 5.2 to 7.2% and their ion conduction values were as large as 2.0 to 6.5 S. Furthermore, their discharge capacities were as large as 0.52 to 1.67 Ah/cm$^3$. On the other hand, samples Nos. 11 to 13 had a thickness of 1.1 to 1.7 mm and sample No. 15 had a voidage of 64.7%, and ion conduction values of these samples were as small as 0.1 to 0.81 S. Furthermore, their discharge capacities were as small as 0.08 to 0.23 Ah/cm$^3$. A comparison between FIGS. 1 and 2 shows that sample No. 6 (see FIG. 1) which is a working example has higher adhesion of constituent particles and therefore better denseness than sample No. 15 (see FIG. 2) which is a comparative example. As for sample No. 14, because it could not hold a sheet form owing to shrinkage during firing, its ion conduction value could not be measured.

INDUSTRIAL APPLICABILITY

The solid electrolyte sheet obtained by the method according to the present invention is suitable for use not only in cells, including a sodium ion all-solid-state secondary cell and a sodium-sulfur cell, but also as solid electrolytes for gas sensors, including a $CO_2$ sensor and an $NO_2$ sensor.

The invention claimed is:

1. A solid electrolyte sheet containing β-alumina and/or β"-alumina and having a thickness of 1 mm or less and a voidage of 20% or less, wherein
the solid electrolyte sheet includes, in % by mole, 65 to 98% $Al_2O_3$, 2 to 20% $Na_2O$, 0.3 to 10% of at least one of MgO and $Li_2O$, and 1 to 15% $ZrO_2$.

2. The solid electrolyte sheet according to claim 1, having an ion conduction value of 1 S to 6.5 S.

3. A solid electrolyte sheet containing p-alumina and/or β"-alumina and having a thickness of 1 mm or less and a voidage of 20% or less, wherein
the solid electrolyte sheet includes, in % by mole, 65 to 98% $Al_2O_3$ 2 to 20% $Na_2O$, 0.3 to 10% of at least one of MgO and $Li_2O$, and 0.01 to 5% $Y_2O_3$.

4. The solid electrolyte sheet according to claim 1, wherein the solid electrolyte sheet is for use in a sodium ion all-solid-state secondary cell.

5. A sodium ion all-solid-state secondary cell including the solid electrolyte sheet according to claim 4, a positive electrode layer formed on one side of the solid electrolyte sheet, and a negative electrode layer formed on the other side of the solid electrolyte sheet.

6. A solid electrolyte sheet containing β-alumina and/or β"-alumina and having a thickness of 1 mm or less and an ion conduction value of 1 S to 6.5 S, wherein
the solid electrolyte sheet includes, in % by mole, 65 to 98% $Al_2O_3$, 2 to 20% $Na_2O$, 0.3 to 10% of at least one of MgO and $Li_2O$, and 1 to 15% $ZrO_2$.

7. A solid electrolyte sheet containing p-alumina and/or β"-alumina and having a thickness of 1 mm or less and an ion conduction value of 1 S to 6.5 S, wherein
the solid electrolyte sheet includes, in % by mole, 65 to 98% $Al_2O_3$, 2 to 20% $Na_2O$, 0.3 to 10% of at least one of MgO and $Li_2O$, and 0.01 to 5% $Y_2O_3$.

8. A solid electrolyte sheet containing β-alumina and/or β"-alumina and having a thickness of 1 mm or less and a voidage of 20% or less, wherein
the solid electrolyte sheet includes, in % by mole, 65 to 98% $Al_2O_3$, 2 to 20% $Na_2O$, 0.3 to 15% of at least one of MgO and $Li_2O$, and 1 to 15% $ZrO_2$ or 0.01 to 5% $Y_2O_3$.

9. A solid electrolyte sheet containing β-alumina and/or β"-alumina and having a thickness of 1 mm or less and an ion conduction value of 1 S to 6.5 S, wherein
the solid electrolyte sheet includes, in % by mole, 65 to 98% $Al_2O_3$, 2 to 20% $Na_2O$, 0.3 to 15% of at least one of MgO and $Li_2O$, and 1 to 15% $ZrO_2$ or 0.01 to 5% $Y_2O_3$.

* * * * *